United States Patent [19]
Adegeest

[11] Patent Number: 5,872,573
[45] Date of Patent: Feb. 16, 1999

[54] METHOD AND SYSTEM FOR IMPROVING LEGIBILITY OF TEXT AND GRAPHIC OBJECTS LAID OVER CONTINUOUS-TONE GRAPHICS

[75] Inventor: Frank Adegeest, Sint Jansteen, Netherlands

[73] Assignee: Barlo Graphics N.V., Gent, Belgium

[21] Appl. No.: 777,466

[22] Filed: Dec. 30, 1996

[51] Int. Cl.$^6$ .................................................. G06F 15/00
[52] U.S. Cl. .......................................................... 345/434
[58] Field of Search ...................................... 345/434, 433, 345/435, 113, 114, 115, 116, 117, 118

[56] References Cited

U.S. PATENT DOCUMENTS 5,355,446  10/1994  Maayan ..................................... 345/434
5,465,160  11/1995  Kamo et al. ............................. 358/401

FOREIGN PATENT DOCUMENTS 0 588 380   3/1994   European Pat. Off. .

Primary Examiner—Phu K. Nguyen
Attorney, Agent, or Firm—Dov Rosenfeld

[57] ABSTRACT

A method and system for processing a set of graphical data representing a page to enhance the legibility of text in the page. The method and system select text to be enhanced from the set of graphical data, text in this context including any logos and other graphical objects selected for enhancement; create raw edging data which includes enhancing edges in an enhancing color for the text to be enhanced; form an edging clip mask which includes areas on the page where the raw edging data is to be visible; and clip the raw edging data with the edging clip mask. When the page includes CT images, the areas on the page where the raw edging data is to be visible include the union of the regions of the page that have CT images, excluding parts of the page not covered by CT images that are ghosted, have a stroke attribute, have a solid fill attribute, or have a vignetted fill attribute.

23 Claims, 14 Drawing Sheets

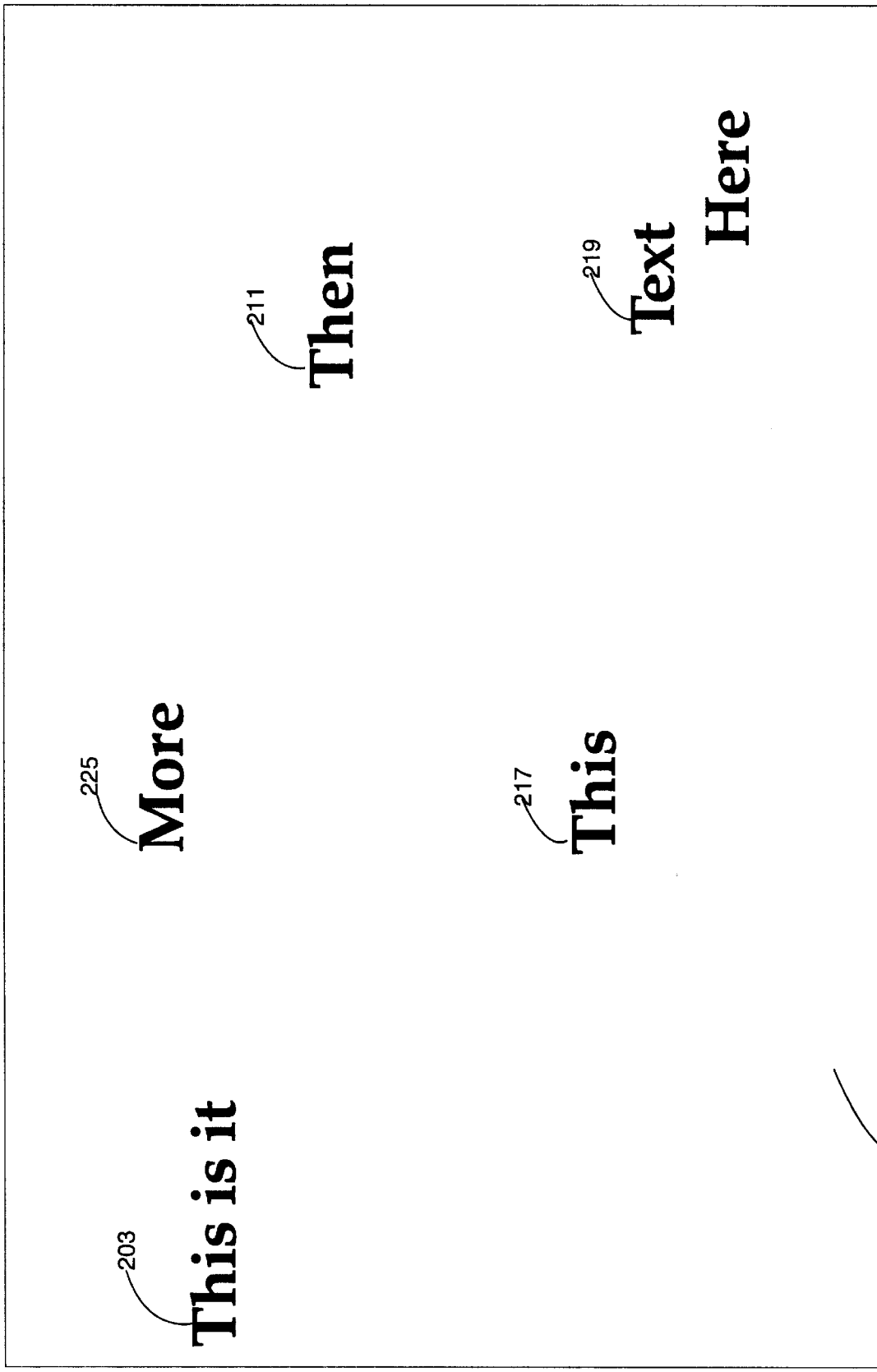

```
Begin
    Search database of page(s) (Scan button in dialog)
    Create selection
        Select text objects
            Show a dialog with the colors (box with toggle) found in
            the selection. The operator can deselect the non-wanted
            colors
            Add line art object to selection or deselect part of selection
            Execute (Perform button in dialog)
        Create text layer
        Put selection on text layer
    Create edging clip mask
        If edging layer with edging clip mask exist then
            goto "Create raw edging data"
        else
            Search database of page(s)
            Select CT clip masks (line art clip paths grouped with CTs)
            Create edging clip mask (a clip path)
                Create union of CT clip masks
                    Exclude (difference)
                Union of line art objects with fill, ghost,
                and/or stroke attribute
            Create edging layer
            Put edging clip mask in edging layer
    Create raw edging data
        Take a copy of the current selection in text layer
        Convert text objects in selection to contours
        Apply a white (or user selected color) fill and stroke attribute
        to these contours
    Create enhancing edge
        Paste raw edging data inside edging clip mask
End
```

Figure 10

METHOD AND SYSTEM FOR IMPROVING LEGIBILITY OF TEXT AND GRAPHIC OBJECTS LAID OVER CONTINUOUS-TONE GRAPHICS

I. BACKGROUND OF THE INVENTION

A. Field of the Invention

The present invention relates generally to the field of graphical data processing and more specifically to a method and system for improving the legibility of text and graphic objects laid over continuous-tone graphic images.

B. Background

In graphic design, an artist typically uses a computer running a graphic design program to compose and edit a design. The design is stored as a graphical data file which is ultimately sent to an output process for printing and/or display. In commercial design, the output process might include a preprint process followed by the process of printing itself. Thus, today's digital art usually is created in the form of an electronic file, and such a file commonly contains commands written in a page description language (PDL) such as PostScript®, developed by Adobe Systems, Inc.

Often a graphic designer has a situation of a page with some continuous-tone (CT) images, with text or logos, say in black, on top of the CT images. It is known that if one places a thin frame or edge, say in white, around each of the fonts making up the text, or around the graphic objects such as a logo, the legibility of the text or graphic is improved. With the advent of computerized design, it is desirable to automate this process, which shall be called "edging" herein. Automation is complicated by the complex rules that determine when and when not to place an enhancing edge around a given border of a font or graphic. For example, whenever part of a font or graphic is laid over line-art, as distinct from CT images, an enhancing edge is not desired. Similarly, an enhancing edge is not desired when the text or graphic is on top of a solidly colored area which in turn is on top of a CT image. Another situation when an enhancing edge is not desired is when the text or graphic is on top of a "ghosted" area, that is, an area of a CT image where the intensity of the image has already been brought down somewhat in order to improve the legibility of the text or graphic. Also, when only part of a font or graphic covers a CT, it is desirable that only that part of the text or graphic which is over the CT should be edged.

One prior art method that can be used to place enhancing edges around text and graphic objects is the process known as trapping (also called framing and gripping). Trapping is the process of causing objects that are adjacent to other objects of a different color to be made relatively larger or smaller in order to avoid problems caused by misregistration during printing. Modern automatic trapping techniques perform trapping by placing a small frame or "trap" around those objects that are determined to require trapping. That trap may be used also to generate an enhancing edge. One needs to generate the trap, select it, and change its color to that required for the enhancing edge. The shortcoming of such a prior art method is that trapping rules are such that some text traps are generated inwards, while others outwards, depending on the relative colors of the text and the surroundings. In addition, it is often required to modify a design by changing text and/or by moving the relative locations of objects in a page. For example, a modification of moving some text relative to a background CT may be required. The complete trapping operation would then need to be repeated. Similarly, deleting or modifying the text that was trapped for edge enhancing purposes would require repeating the trapping operation.

Another problem with prior art methods for generating an enhancing edge is that the shape and attribute of the edges is fixed. That is, for example with trapping techniques, the trap is a fixed shape. It would be desirable to enhance the legibility of selected text and graphic objects by adding "soft" enhancing edges, such as provided by vignettes. The idea is that such a "soft" edge would fade away into the background over a specified distance.

Thus there is a need in the art for a method to automatically place an enhancing edge over selected text or graphics.

Thus there also is a need in the art for a method that automatically generates an enhancing edge around text fonts and graphic objects when such an enhancing edge is required, that is dynamic in that whenever the text or graphic objects are moved in relation to the background, the corresponding edging automatically moves, and whenever some of the text or graphic objects to be enhanced are modified, the complete edging operation does not need to be repeated.

Thus there also is a need in the art for a method that enables enhancement with soft enhancing edges such as vignettes.

II. SUMMARY OF THE INVENTION

A. Objects of the Invention

Thus one object of the present invention is a computer-implemented method that automatically generates an enhancing edge around text fonts and graphic objects when such an enhancing edge is required.

Another object is a computer-implemented method that dynamically generates the enhancing edge around text fonts and graphic objects in that whenever the text or graphic objects are moved in relation to the background, the edging automatically moves.

Another object is a computer-implemented method that dynamically generates the enhancing edge around text fonts and graphic objects in that whenever some of the text or graphic objects to be enhanced are modified, the complete edging operation does not need to be repeated.

Yet another object is a system for generating an enhancing edge around selected text and graphics where such an enhancing edge is needed.

B. Overview of the Invention

These and other objects of the invention are realized in a method for processing a set of graphical data representing a page to enhance the legibility of text in the page. The method comprises (a) selecting text to be enhanced from the set of graphical data, text in this context including any logos and other graphical objects selected for enhancement; (b) creating raw edging data which includes enhancing edges in an enhancing color for the text to be enhanced; (c) forming an edging clip mask which describes areas on the page where the raw edging data is to be visible; and (d) clipping the raw edging data with the edging clip mask. One feature of the method includes the enhancing edges being in a default color, which in one preferred embodiment is white. In a specific embodiment, when the page includes CT images, the areas on the page where the raw edging data is to be visible include the union of the regions of the page that have CT images, but not parts of the page not covered by CT images that are ghosted, have a stroke attribute, have a solid fill attribute, or have a vignetted fill attribute.

In a specific embodiment, the enhancing edges are created by applying a stroke and fill attribute in the enhancing color to each outline of the text to be enhanced. In another embodiment, soft edges are applied using an edge vignette.

When some of the text to be enhanced is to be modified, the enhancing edges for the to-be-modified text are deleted and after that text has been modified, enhancing edges for the modified text are created and added to the raw edging data.

In a specific embodiment of the method of the present invention, a multilayer data structure for the page is created including a text layer of the text to be enhanced as the top layer, an edging layer of the raw edging data clipped with the edging clip mask as the next layer, and a bottom layer of the set of graphical data except for the to-be-enhanced text as the next level.

In yet another embodiment of the method, a link is created between each element in the text to be enhanced and the corresponding enhancing edges in the raw edging data, so that modifying a subset of the text to be enhanced leads to a corresponding modification to the enhancing edges in the raw edging data corresponding to the elements of the subset, the corresponding modification using the links.

Also disclosed is a system for processing a set of graphical data representing a page to enhance the legibility of text in the page, the system including (a) a text selector mechanism for selecting text to be enhanced from the graphical data of the page; (b) a raw edging data creator for creating enhancing edges of the text to be enhanced; (c) an edging clip mask creator for creating an edging clip mask describing the areas on the page where the enhancing edges are to be visible; and (d) a clipper for clipping the enhancing edges with the edging clip mask.

In one preferred embodiment, the elements of the system are implemented as sets of software commands loaded in the memory subsystem of a computer system and executing on the processor of the computer system. In a specific embodiment, the computer system includes a file storage system where the set of graphical data of the page is stored. Another feature includes software commands for creating a multilayer data structure for the page including a text layer of the text to be enhanced as the top layer, an edging layer of the raw edging data clipped with the edging clip mask as the next layer, and a bottom layer of the set of graphical data except for the text as the next level. The layers are stored in the file subsystem of the computer system.

III. BRIEF DESCRIPTION OF THE DRAWINGS

FIG. 3 shows the text selected for enhancing according to the invention, this forming the text layer for the page of FIG. 2(a);

FIG. 10 shows the pseudocode for a computer program for implementing the method of the present invention.

IV. DESCRIPTION OF THE PREFERRED EMBODIMENT

A. System Architecture

A preferred embodiment of the present invention is a method implemented on a computer workstation. The steps of the method are performed by the computer executing a software program integrated with a layout and illustration package. The software application program may be used in an interactive mode during the design stages to improve the legibility of text fonts and graphic objects as they are created. Alternatively, it may be used to modify a graphical art work after it has been completed and after the legibility of some text fonts and graphic objects has been enhanced. Alternatively, it may be used in a batch mode to identify and enhance the legibility of text fonts and graphic objects in a graphical art work after it has been completed.

Figure 1:
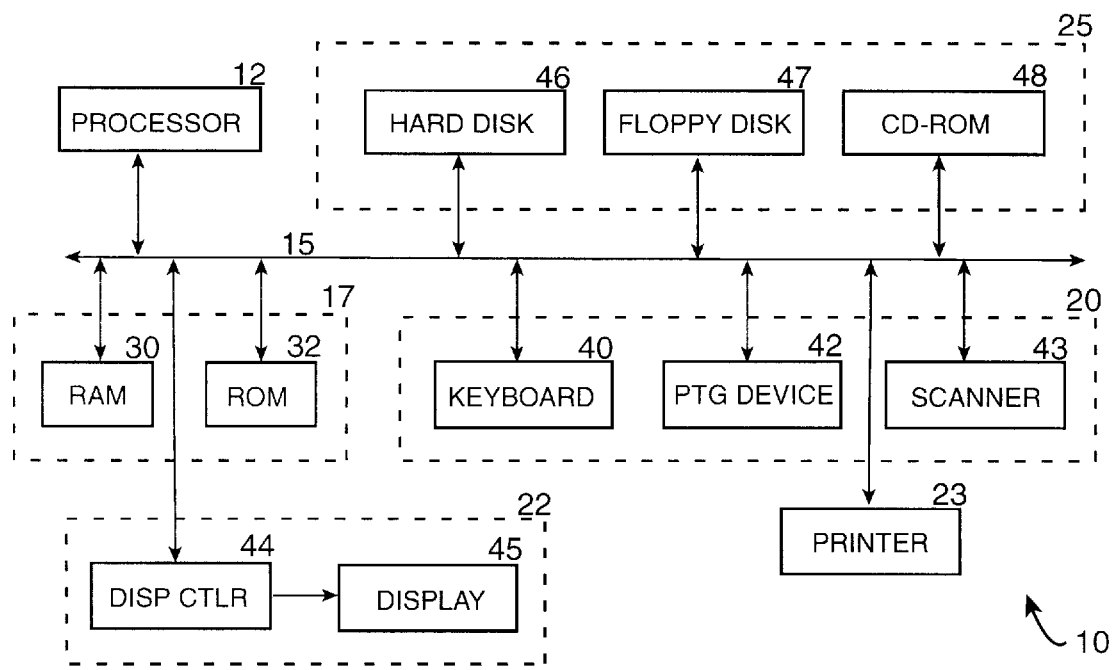
FIG. 1 is a block diagram of a typical computer system in which the present invention may be embodied.

FIG. 1 is a simplified block diagram of a computer system 10 in which the present invention may be embodied. The computer system configuration illustrated at this high level is standard, and as such, FIG. 1 is labeled "Prior Art." A computer system such as system 10, suitably programmed to embody the present invention, however, is not prior art. The specific embodiments of the invention are embodied in a general-purpose computer system such as shown in FIG. 1, and the remaining description will generally assume that environment. However, the invention may be embodied in dedicated devices such as graphic design stations, printer servers, and printer controllers.

In accordance with known practice, the computer system includes a processor 12 that communicates with a number of peripheral devices via a bus subsystem 15. These peripheral devices typically include a memory subsystem 17, a user input facility 20, a display subsystem 22, output devices such as a printer 23, and a file storage system 25.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of personal computers (PCs) and workstations.

Bus subsystem 15 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses, or a modem on a serial port. The computer system may be a desktop system or a portable system or an embedded controller.

Memory subsystem 17 includes a number of memories including a main random access memory (RAM) 30 and a read only memory (ROM) 32 in which fixed instructions are stored. In the case of Macintosh-compatible personal computers this would include portions of the operating system; in the case of IBM-compatible personal computers, this would include the BIOS (basic input/output system).

User input facility 20 typically includes a keyboard 40 and may further include a pointing device 42 and a scanner 43. The pointing device may be an indirect pointing device such as a mouse, trackball, touchpad, or graphics tablet, or a direct pointing device such as a touchscreen incorporated into the display.

Display subsystem 22 typically includes a display controller 44 and a display device 45 coupled to the controller. The display device may be a cathode ray tube (CRT), a flat-panel device such as a liquid crystal display (LCD), or a projection device. Display controller provides control signals to the display device and normally includes a display memory (not shown in the figure) for storing the pixels that appear on the display device.

The file storage system 25 provides persistent (non-volatile) storage for program and data files, and typically includes at least one hard disk drive 46 and at least one floppy disk drive 47. There may also be other devices such as a CD-ROM drive 48 and optical drives. Additionally, the system may include hard drives of the type with removable media cartridges. As noted above, one or more of the drives may be located at a remote location, such as in a server on a local area network or at a site on the Internet's World Wide Web.

B. The Preferred Embodiment of the Method

Figure 2A:
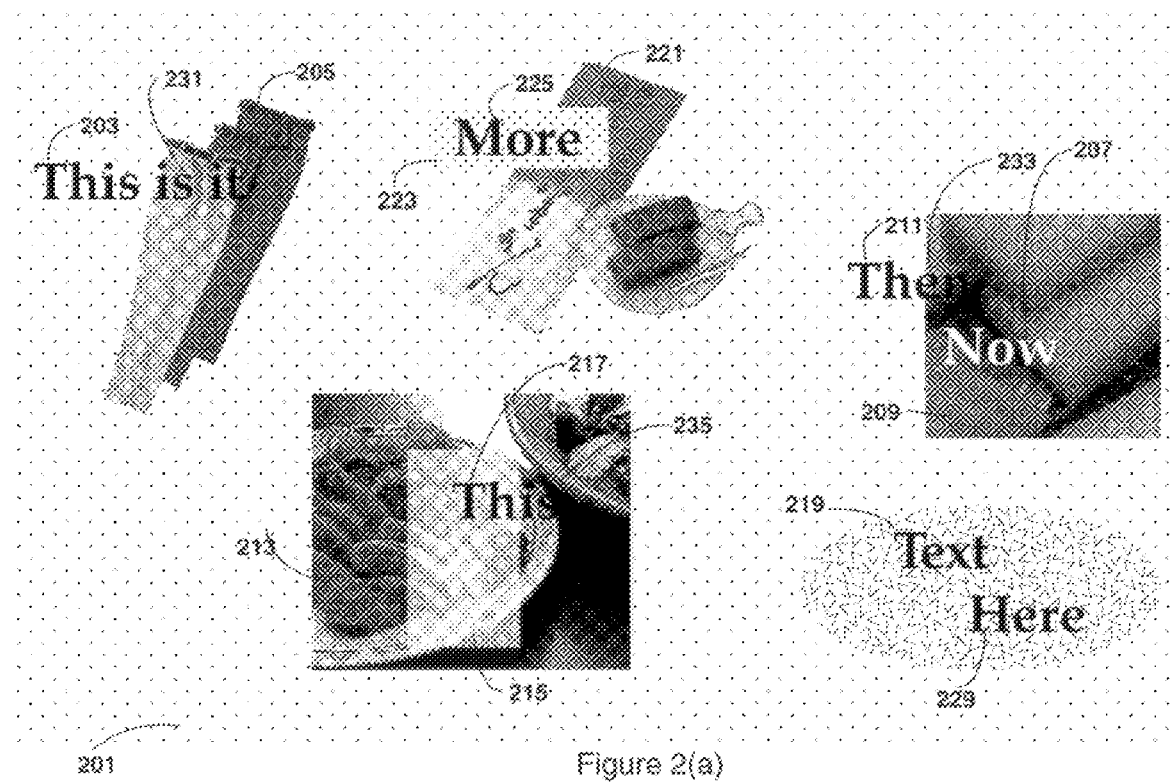
FIG. 2(a) shows a typical complex page which is to be processed according to the invention.

FIG. 2(a) shows a complex page 201 of graphical data which will be used herein as an example to describe operation of the invention. In this figure, area 205 is a CT image on which there is shown the text "This is it" denoted by 203. Area 207 is also a CT image with two texts, "Now" designated by 209 and "Then" designated by 211. The color of text 209 is white, and for this example, white is also the color desired for the enhancing edge to enhance the legibility of text, although this invention is not limited to any particular colors. Area 221 is also a CT image, and on it is a solidly colored area 223, and on top of line art 223 is the text "More" designated by 225. Area 213 is also a CT image. Part of this CT image, shown as area 215, has been ghosted. Note that ghosted areas are represented by a line art object that has a ghost fill attribute. The text "This" designated by 217 is shown covering both the ghosted and un-ghosted part of CT image 213. The text "Text" designated by 219 and the text "Here" designated by 229 appear over the background 227. Although the page 201 shown in FIG. 2 has text, the present invention works equally with text, logos, or any graphical objects whose "legibility" needs to be enhanced by placing a light enhancing edge where desired.

Figure 2B:
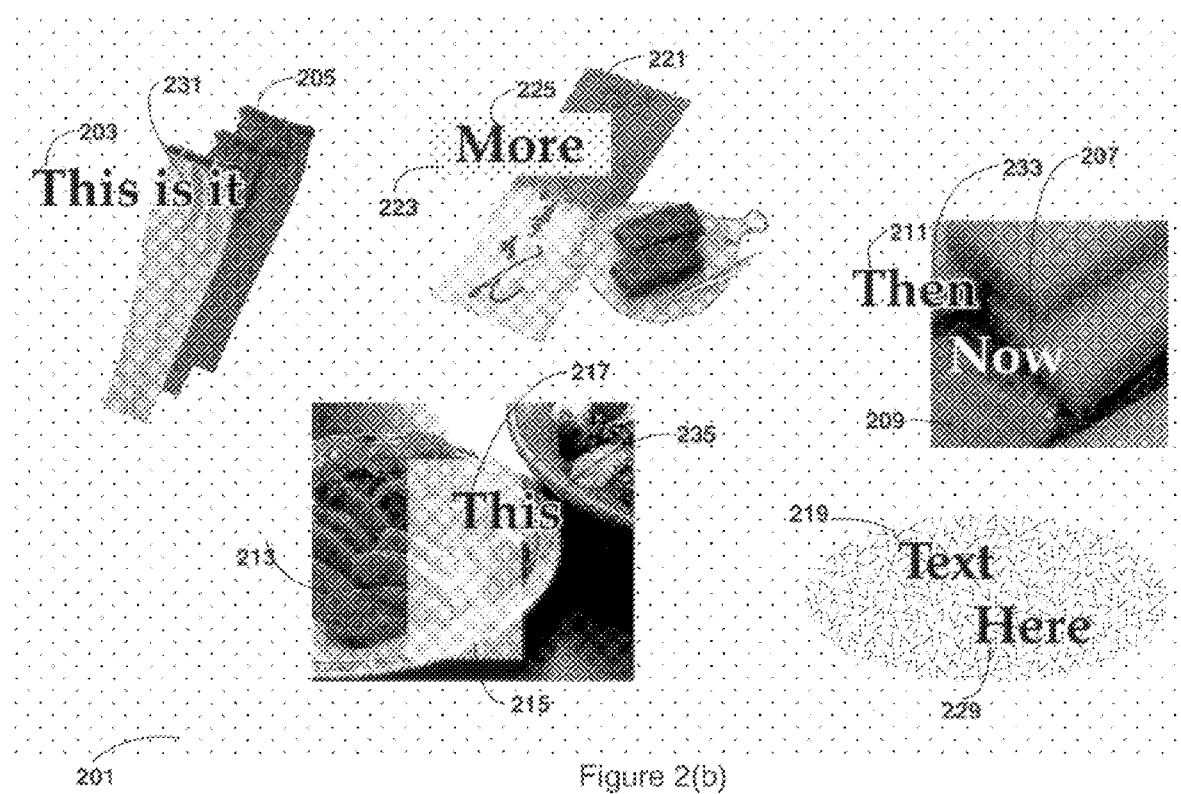
FIG. 2(b) shows the results of carrying out the edging operation on the example page of FIG. 2(a) in accordance with the present invention.
Figure 2C:
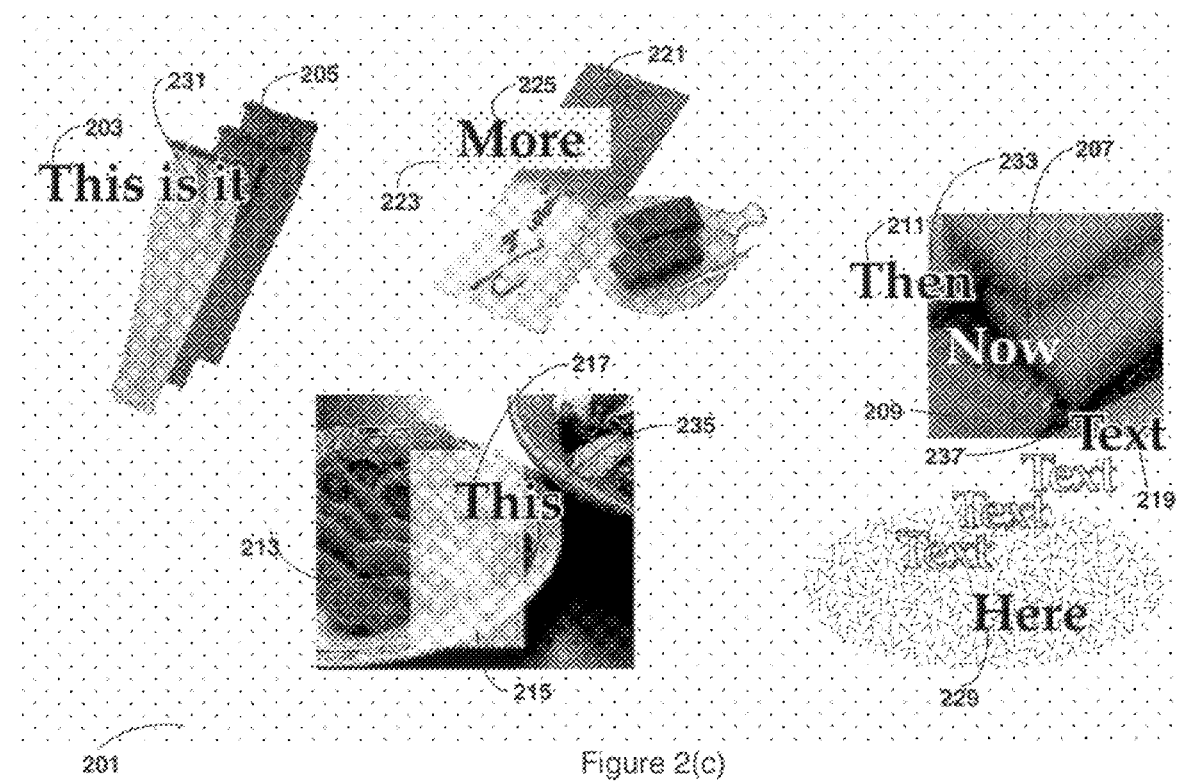
FIG. 2(c) shows the results of moving the text element "Text" of FIG. 2(b) when edging is carried out in accordance with the present invention.

FIG. 2(b) shows the results of carrying out the edging operation, according to the present invention, on the page of FIG. 2(a). Enhancing edges 231, 233 and 235 are shown around the text 203, 211 and 217, but only around those parts of the text which are on top of CTs. FIG. 2(c) shows the same page as FIG. 2(b), including the moving of text 219 ("Text") from on top of region 227 to partially covering CT 207. According to the present invention, an additional enhancing edge 237 appears around those parts of text 219 which cover CT 207.

In a typical environment, the page of graphical data to be processed, for example that of FIG. 2(a) will be presented to the user in the form of a graphical file in file storage system 25 to be computer processed on computer system 10. In the preferred embodiment, the file is a PostScript file, that is, a set of instructions in the graphical language PostScript developed by Adobe Systems, Inc. The method is carried out in a graphical programming environment, which is able to deal with images in multiple layers. The PostScript file contains a sequential list of commands which, when interpreted, generate graphical objects such as vectors, splines, text, and continuous tones (CTs). The PostScript language provides for describing the properties of objects such as position, color, size, fill attribute, and other attributes, such as the relationship between objects to provide for grouping of objects and placement of one object over another. The implementation of the method of the present invention on computer system 10 interprets these PostScript commands and generates an object display list (ODL) of graphical objects. The resulting ODL database consists of a list of exactly those objects that the PostScript generated. These graphical objects can be, for example, of a line art type, a contour, a line art pixel, a clip path (used to clip other objects to make only parts of those objects visible), or a text object. In addition, these objects can be linked (also called "grouped"), so they behave together as a single object. In a preferred embodiment, the format used for the object display list is GRO™ (GRaphics Objects), the native internal format used by Barco Graphics, the assignee of the present invention. Like PostScript, GRO is device and resolution independent, object oriented, stores text as text, and uses the path construct to represent line art. Unlike PostScript, however, the GRO format is not a programming language but a structured list containing mathematical descriptions of the graphical objects. The step of working with the page as the GRO format is preferable, but not required for the present invention. How to implement the invention using other graphical formats will be clear to those in the art.

The method of the present invention proceeds as follows. Starting with the GRO (or PostScript) description of the page prior to edging, the description being a set of graphical data representing the page, all the text objects on the page are selected and the color of these text objects is noted. In the preferred embodiment, this list is kept in a table in computer system 10. Again, note that the word "text" in this context might include text, logos, and/or any graphical objects whose legibility is to be enhanced. In the preferred embodiment, a default color used for the enhancing edge is defined. This default color preferably is white. There are advantages to excluding from this list text which is in this default color because typically, an enhancing edge in the default color (e.g., white) would not be distinctly visible on text of that color (e.g., white)-it would only make that text appear larger. The preferred embodiment allows one to include or exclude such white colored text or logos from this list according to a toggle, which is initially set to exclude. FIG. 3 shows the text of the example page of FIG. 2(a). Note that since text 209 ("Now") is in white, it has not been selected according to the default setting of the toggle which is to exclude such text.

The table is displayed to the user, and the user may now manually select any text color or colors to be excluded from the enhancing operation. Any additional line art objects such as logos to be included for enhancement also may be selected in this dialog session. In addition, the user may select the color desired for the enhancing edge to be different from the default color, or, in an improved embodiment, the user may change the default color for this enhancing edge, typically white. In addition, the user can change the toggle from excluding text and other selections which are in the default color (e.g., white) to including such text and other selected objects. The reason for allowing this change in the toggle is that, taking as an example the situation where the default enhancing color is white, there are cases where one has white text on monochrome (black and white) images. In general, the legibility of such text is very poor. Suppose in such a case that the legibility of the white text needs to be enhanced with a black edge. The user can select an enhancing color other than the default white (e.g., black), deselect all colors other than white, switch the toggle to include white text, and execute the select function. In the example of FIG. 2, it is assumed that no further exclusions or selections are desired. A layer, called the "text layer" is created, and the selected objects added to it. The result of this step is shown in FIG. 3 as text layer 301.

Figure 4:
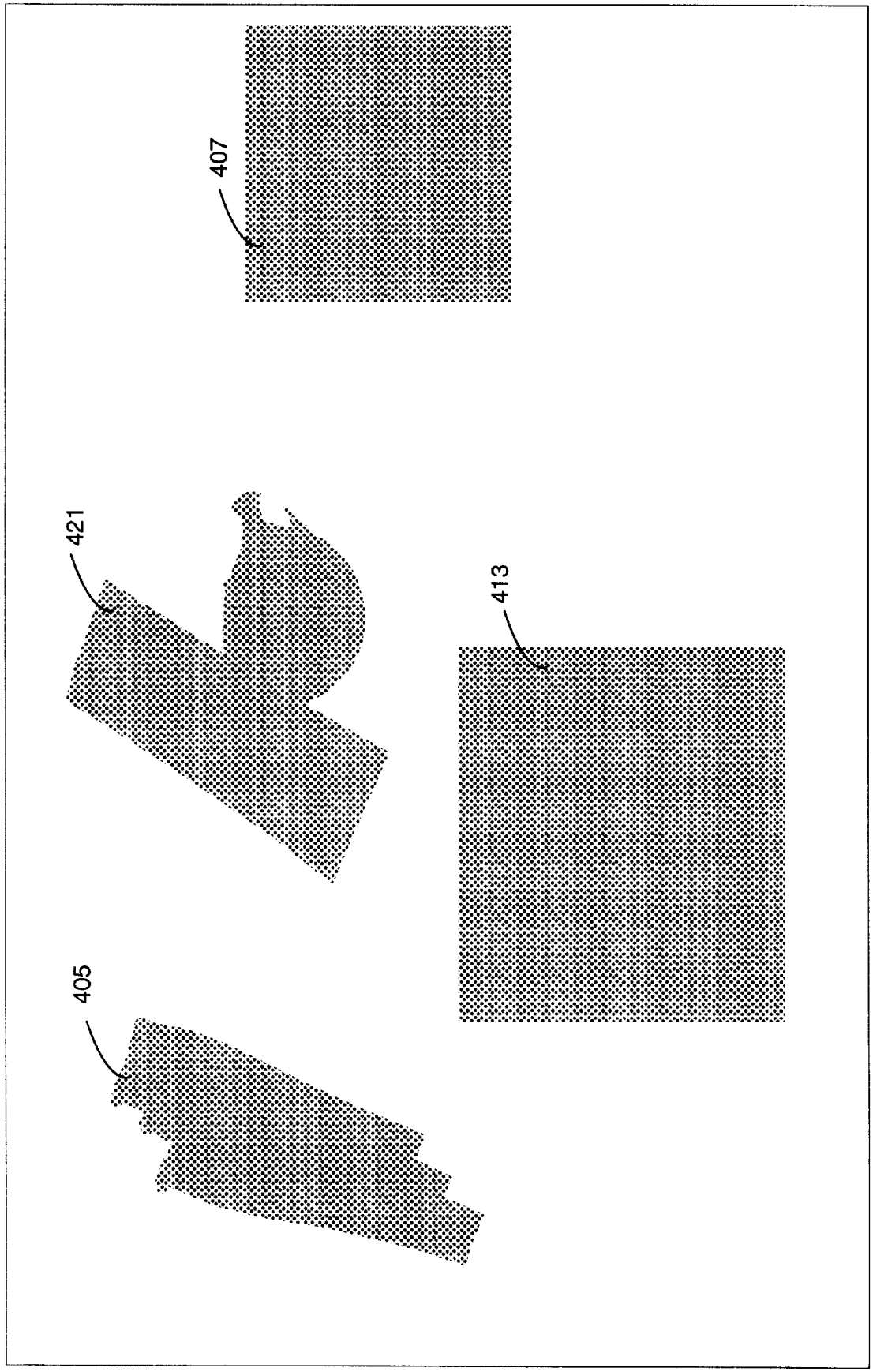
FIG. 4 shows the union of all the CT clip masks in the page of FIG. 2(a)
Figure 5:
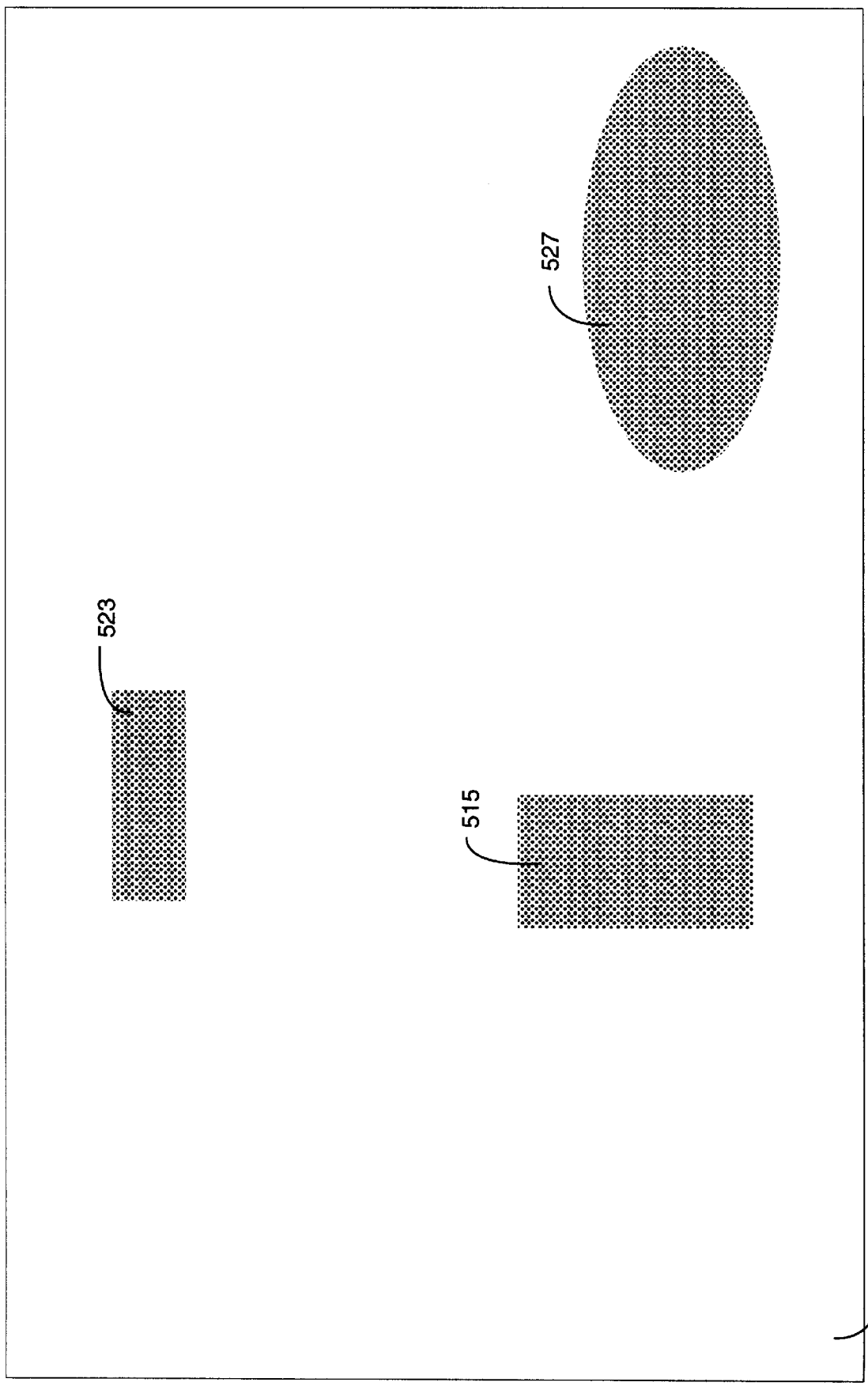
FIG. 5 shows a union of the line art and ghost masks in the page of FIG. 2(a)

The method determines the areas on the page where the enhancing edges on the selected text (including logos and other graphical objects selected for enhancement) are to be visible. To do this, from the graphical data representing the page (the PostScript or GRO file of the page), one generates objects which are the clip masks of the CT areas. A CT clip mask is a line art clip path grouped to the CT, used for clipping the CT image. The clip path defines what area of the CT is visible. That is, all data outside of this path is made invisible. The general idea of the method is to determine the clip masks of the CT areas, and then to put an enhancing edge around the text, using the CT clip masks to determine whether or not an enhancing edge should be visible on a particular text location. However, one needs to be able to modify the design, for example to move the text from area to area, and there may be hundreds of CT clip masks on a page. To simplify the determination of when to make an enhancing edge visible and when not to make an enhancing edge visible, an "edging clip mask" is produced by taking the union of all the CT clip masks and removing (excluding) from this union, preferably using a difference operation, the union of all the areas not covered by CT images that are ghosted, have a stroke attribute, have a solid fill attribute, and/or have a vignetted fill attribute. Such areas can be defined by masks which will be called generalized knockout masks to include ghosted objects that do not have 100% masking. Fill areas that are covered by CT images are ignored. Other types of areas can be included or excluded from the edging clip mask without deviating from the scope of the present invention. In the preferred embodiment, line art objects in the GRO file may be CT clip masks, may have a stroke attribute, or may have a fill attribute, the fill attribute being a solid fill, a ghost fill or a vignette fill. Ghosted areas are represented by a line art object which has a ghost fill attribute. Thus, in the preferred embodiment, let there be N CT image objects, and let there be M filled or stroke-attribute line-art objects that are not covered by CT images, the fill being either a solid fill, ghost fill or vignetted fill. Denote by $CT\text{-}mask_i$ the CT clip mask for the i'th CT area, i=1, 2, ..., N, and denote by $fill\text{-}area_j$ the j'th fill area, j=1, 2, ..., M. The method first forms the union of the CT clip masks, $\cup_{i=1 \text{ to } N}\{CT\text{-}mask_i\}$, where $\cup_{i=1 \text{ to } N}$ denotes the union for all i from 1 through N. The union of the CT clip masks for page 201 in the example of FIG. 2(*a*) is shown in FIG. 4 as area 401 consisting of objects 405, 407, 413 and 421. One then forms the union of all the stroke, solid fill and ghost fill line art areas that are not covered by CT images, that is one forms $\cup_{j=1 \text{ to } M}\{fill\text{-}area_j\}$. For any area with a stroke attribute, the stroke is first converted to an outline, and that outline rather than the stroke is used to generate the union $\cup_{j=1 \text{ to } M}\{fill\text{-}area_j\}$. This union is shown in FIG. 5 as the overall area 501 consisting of objects 515, 523, and 527 for page 201 in the example of FIG. 2(*a*). Define the edging clip mask as $$\text{edging clip mask} = \cup_{i=1 \text{ to } N}\{CT\text{-}mask_i\} - \cup_{j=1 \text{ to } M}\{fill\text{-}area_j\},$$

where "−" is the difference operation. The edging clip mask is called a clip mask because it works in a similar way to the CT clip mask. The edging clip mask is a line art clip path grouped to the raw edging data, used for clipping the raw edging data. That is, the clip path defines what area of the raw edging data is visible; all data outside of this path is made invisible.

In the preferred embodiment, any CT clip masks that are not available for any CT image are created in order to produce the edging clip mask.

Figure 6:
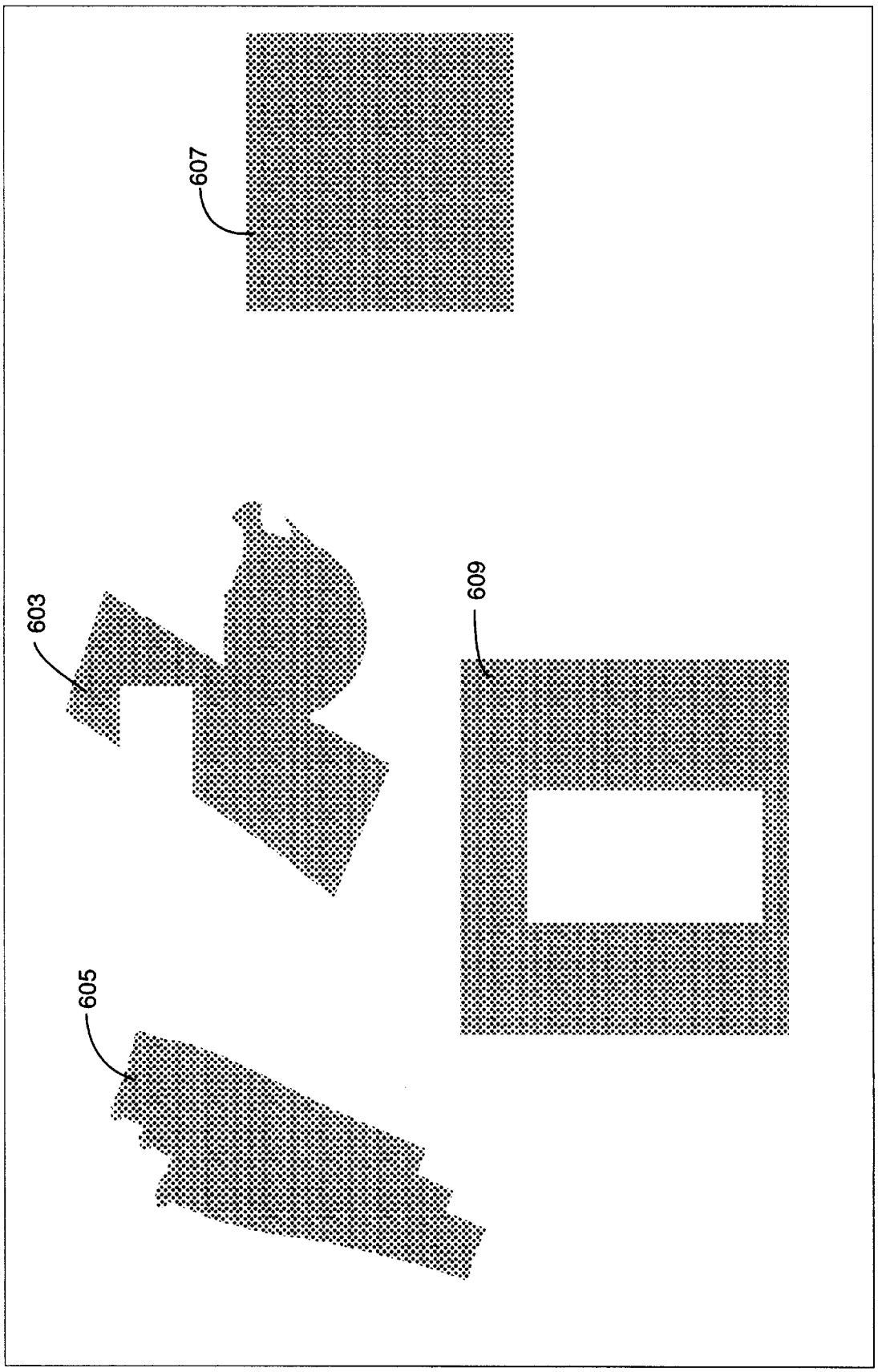
FIG. 6 shows the edging clip mask for the page shown in FIG. 2(a)

The edging clip mask for the example of FIG. 2(*a*) is shown in FIG. 6 as area 601 consisting of objects 605, 607, 609 and 603.

A copy of the selected text to be included from the text selection step above is converted to contour (outline) form. Such conversion is standard in computer graphics, and many if not most graphic manipulation programs have the capability built in. As would be clear to those in the art, some of the text may already be available in outline form, for example, stored in spline or vector outlines as is common in the art. Such text clearly would not need to be converted to outlines.

Although a copy of the text to be enhanced is used in the preferred embodiment for conversion into outline form, other methods of determining the outlines of any text not already available in outline form can be used, as would be clear to one in the art.

A stroke and fill attribute is now applied to the selected text which has been converted into or is already in outline form, the fill being in the default or selected color for the enhancing edge (e.g., white). In the preferred embodiment, each of the strokes extends on both sides of the outline, so that the filled stroke extends both into the text and out of the text with the outline of the text the center line. The original text is later laid over this data, so that only that part of the filled stroke which extends outside the text becomes visible together with the text to enhance the legibility of that text, with a sharp edge at the text outline. In the preferred embodiment, the stroke used for the selected text of the example image of FIG. 2(*a*) has a width of 0.5 mm, and the user may override this default width. In the preferred embodiment used to process the example image of FIG. 2(*a*), whenever a user enters a new value for the default width, that value is stored in a configuration file. That configuration file also includes all other settings created by the user in the text selection dialog session. Each time the application software program for edging is launched, the last stored value for the default width is used. In other embodiments, a default width is set in a table as a function of font size, font weight, and/or font color.

Figure 7A:
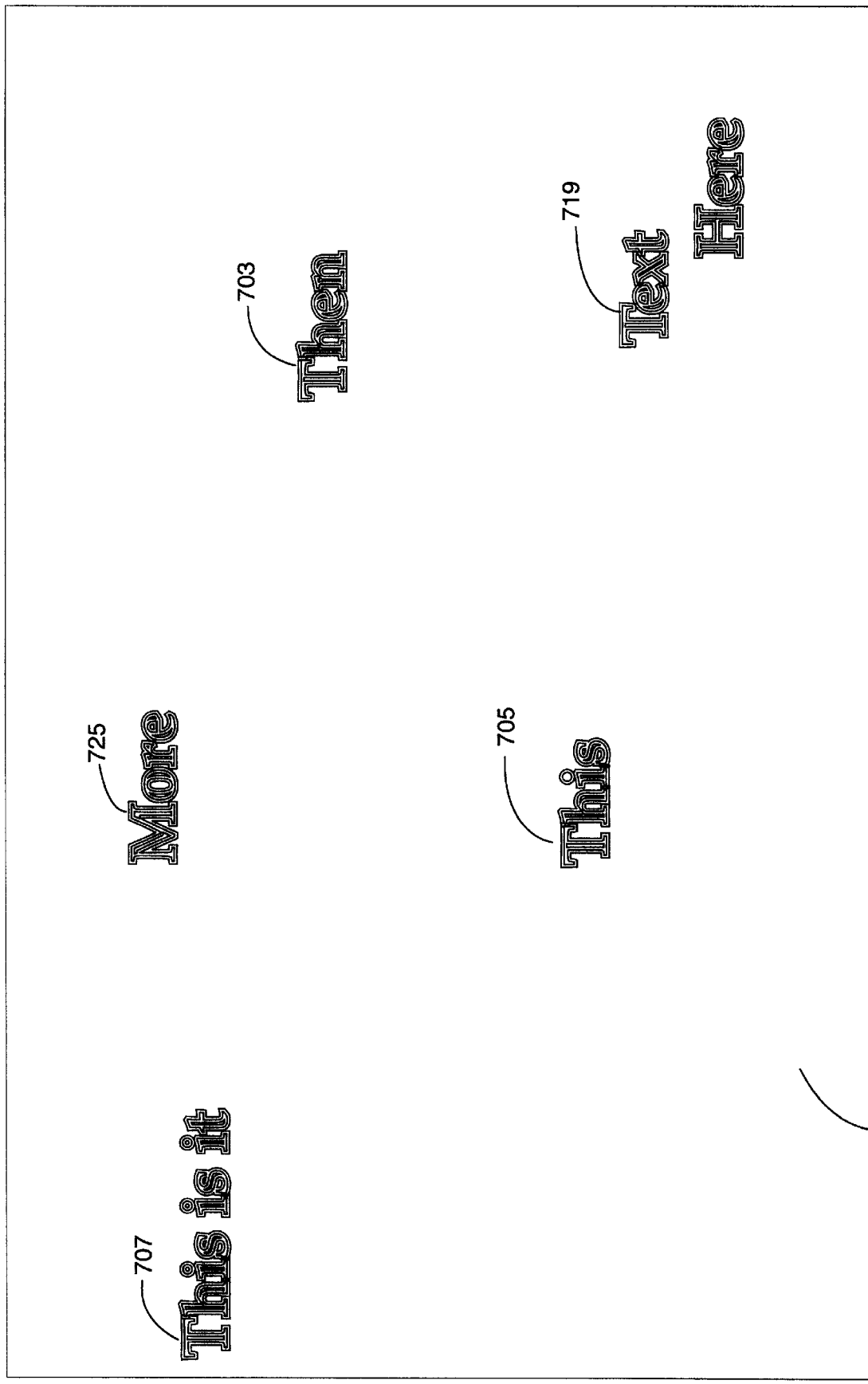
FIG. 7(a) shows the raw edging data for the page shown in FIG. 2(a)
Figure 7B:
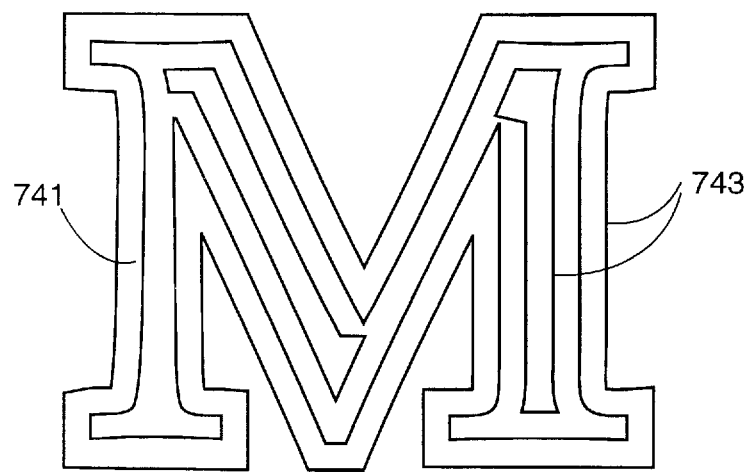
FIG. 7(b) shows the letter "M" of the raw edging data of FIG. 7(a)

The combination of strokes and fills on the outlines is called the "raw edging data." The raw edging data now needs to be modified (clipped) by the CT areas and the areas where no enhancing edge is to be applied. For the example of FIG. 2(a), the raw edging data is shown in FIG. 7(a) as item 701, where the outlines of the text are shown, as are the outlines of the stroke attributes in the color desired for the enhancing edge. FIG. 7(b) shows this more clearly for the letter "M". The outline 741 is shown, as are the borders 743 of the stroke attribute around the outline. Note again that after the text is laid over this data, only that part of the filled stroke that extends from the outline in the direction outside the text is visible.

If "soft" edges are desired, such edges can be obtained by applying an edge vignette to the stroke on the outlines in the raw edging data. An edge vignette is a vignette that is defined by different opacity values at beginning and end points (widthwise). The beginning point is the center of the stroke, while the end points are the boundaries in width of the stroke. In an edge vignette the values of the opacity at the beginning point, the opacity at the end points, and the width are defined. The opacity value will define what percentage of the background will shine through. With an opacity of 100%, none of the background will be visible, and if the opacity is 20%, 80% of the background will shine through. The visual effect is similar to a "halo" effect. When applied to edging data, vignette strokes vary from 100% opacity at the beginning point to 0% at the end points. Once the text is laid over the raw edging data, the effect is that the enhancing edge starts at the outline and fades away into the background over a short distance (related to the width), which may be specified by the user. In the preferred embodiment, unless overridden by the user, the default edge vignette width is the same as for regular enhancing edges. In alternate embodiments, the default vignette edge width is larger than that for a regular enhancing edge to emphasize the effect.

Figure 8:
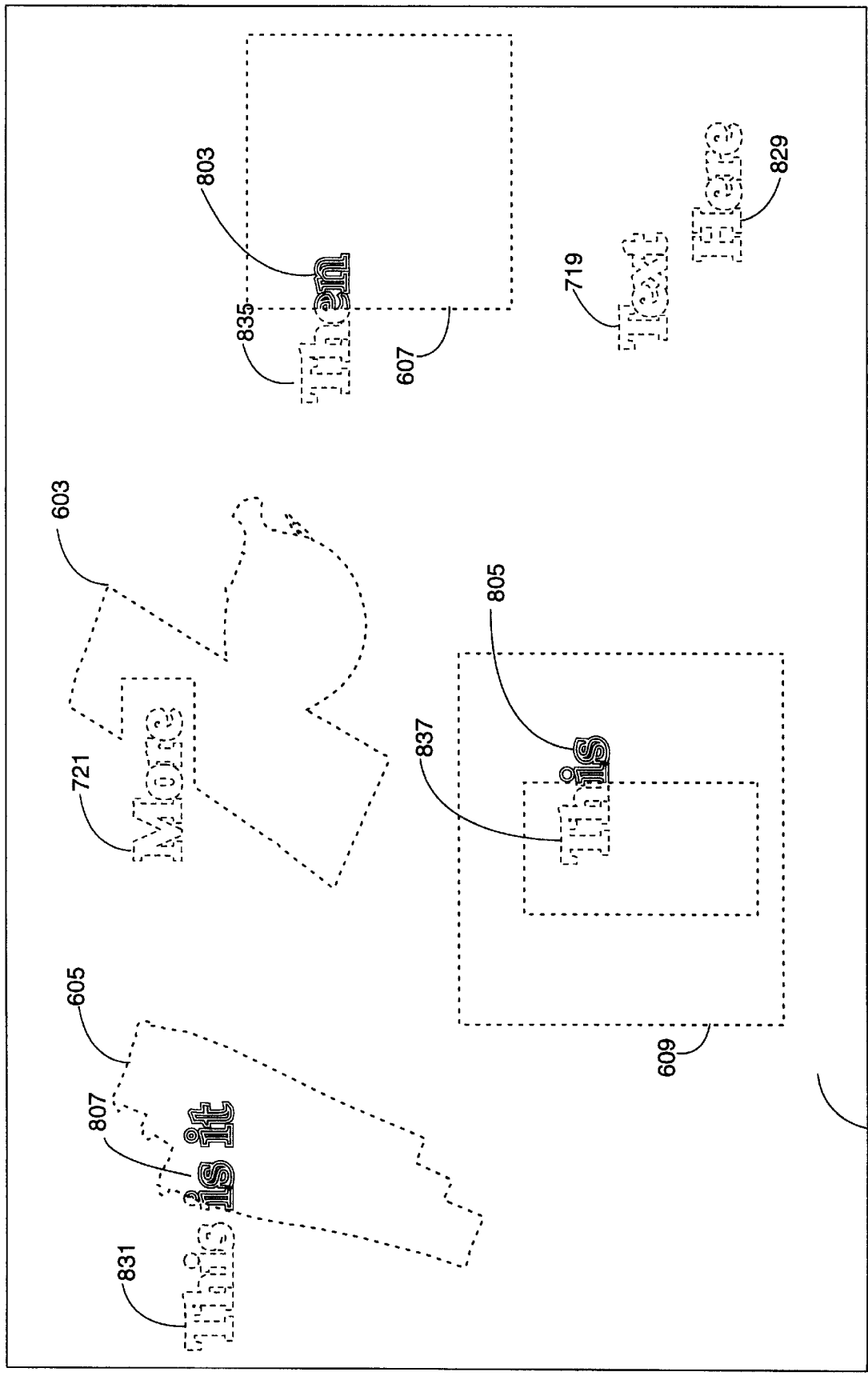
FIG. 8 shows the edging layer for the page shown in FIG. 2(a)

The raw edging data is masked by the edging clip mask to produce a new layer, called the edging layer. That is, the edging layer is comprised of the edging clip mask with the edging data pasted inside the edging clip mask. This edging layer is shown as 801 in FIG. 8 for the example of FIG. 2(a). Objects 603, 605, 607, and 609 from the edging clip mask 601 of FIG. 6 are shown as dotted line borders in FIG. 8. Note that while all the objects of the raw edging data are in the edging layer, they are not all visible because they are masked (clipped) by the edging clip mask. For example, in FIG. 8, only part 807 ("is it") of the outline object 707 ("This is it") of FIG. 7 is visible, while the part 831 ("This") is not visible and shown in FIG. 8 in dotted form.

Figure 9:
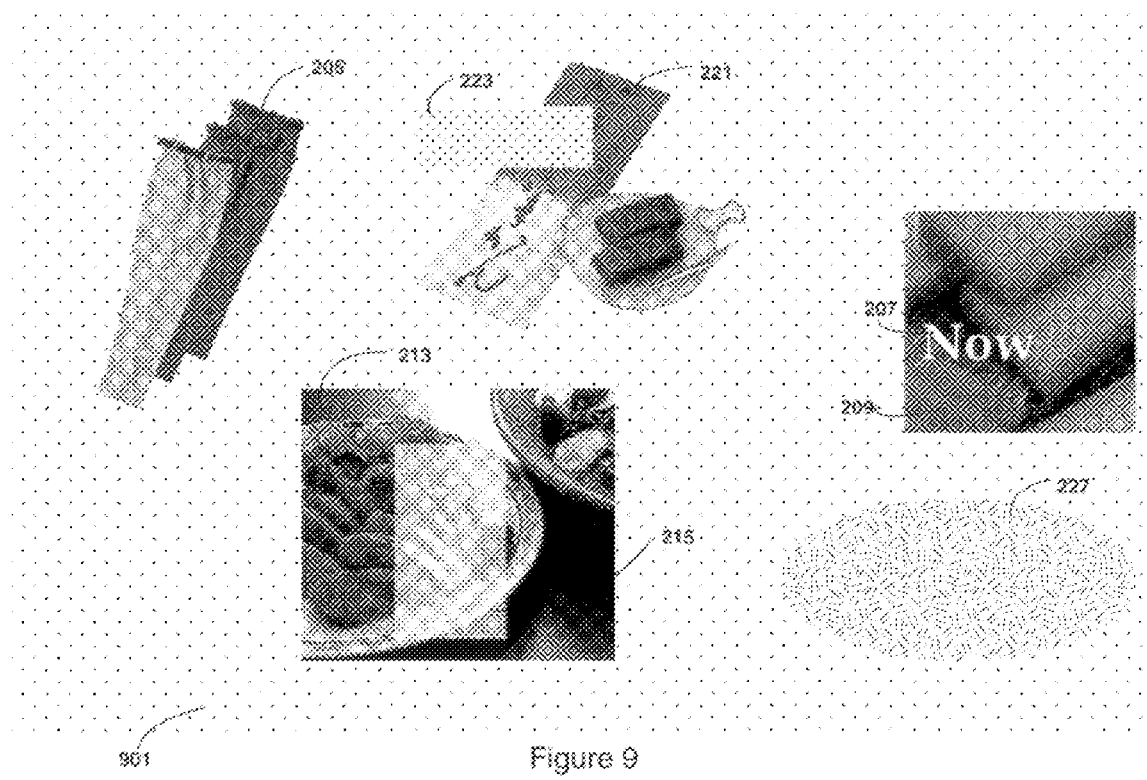
FIG. 9 shows the bottom layer of all data other than the text layer for the page of FIG. 2(a)

The edging layer and the text layer are now incorporated into a new version of the GRO file, which is a multilevel data structure which preferably has three layers. Assuming that the original GRO file contains a single layer of all the elements in the page, the multilevel data structure preferably includes: (1) as the top layer, the text layer comprising the text and/or graphic objects to be enhanced, as selected in the selection step, (2) as the next layer, the edging layer, and (3) as the bottom layer, a layer containing the CT images and all other elements in the page. In alternate embodiments, where the multilevel data structure might include more than three layers, the order of these three particular layers is important. The edging layer preferably is under the text layer, and the bottom layer is somewhere under the edging layer. For the particular example, for a three layer data structure, the three layers would be the text layer 301 shown in FIG. 3, the edging layer 801 of FIG. 8, and the layer 901 shown in FIG. 9 consisting of all objects other than those in the text layer.

The method of the present invention is preferably implemented as a set of computer program instructions running on computer system 10. FIG. 10 shows the pseudocode summarizing the steps of creating the three layer representation. Since the bottom layer is available from the original data, only creation of the text layer and edging layer is included in the pseudocode. A sample computer program implementing the pseudocode of FIG. 10 is provided in the Appendix. Features such as having a user selected color for the enhancing edge are not included in the actual code of the Appendix, and how to include this and other features would be clear to one in the art.

The advantage of representing the image as three layers is that each layer is individually editable. For example, one can now move, change text, change objects, change the thickness of the enhancing edges on individual items in the text layer, and so forth. This editability is important, for example, in a catalog where the items (CT images, for example) might not change, but the text showing the prices that are overlaid on the CT images is regularly changed.

Any time any change to a text object, logo, and/or other enhanced graphical object occurs, the user selects the text or object to be modified. The method checks if the edging layer exists for this image. If not, modifications are made to the selected object, and the whole procedure is repeated as above. If yes, modifications are made to this object and the old edging data for the selected object is deleted, if it exists. The method of the present invention now will check if the selected items are text objects, composed text objects, that is, non-editable text, or outline graphic objects. In case of text objects or composed text objects, these are converted to contours, and in the case of other objects, for example logos, which typically are already in outline form, a copy of these objects is used. The modified text or graphic is now in contour form. A stroke and fill attribute is added, and the result is added to the existing edging clip mask of the edging layer.

As an example, suppose it is desired to change the text 203 from "This is it" to "This it is." The program now proceeds as follows. The program checks if there is an edging layer. In this case, there is. The outline 707 of the "This is it" text 203 is removed from the edging layer 801. The text 203 in the text layer of FIG. 3 is changed from "This is it" to "This it is." The program selects this text item 203 spelling "This it is" and proceeds as before to create an outline of "This it is," to make a new edging data for this selected item by adding a stroke and fill attribute, and then to group the new edging data with the already existing edging clip mask of the edging layer.

In an improved embodiment, when the three layers are created, the method also creates a link between each object in the text layer and the edging layer, so that if any item is changed in the text layer, then the appropriate changes are also automatically made in the edging layer. For example, if any text is changed, a new outline and raw edging data object is generated, and the corresponding object in the edging layer is changed.

C. The Preferred Embodiment of the System

Figure 11:
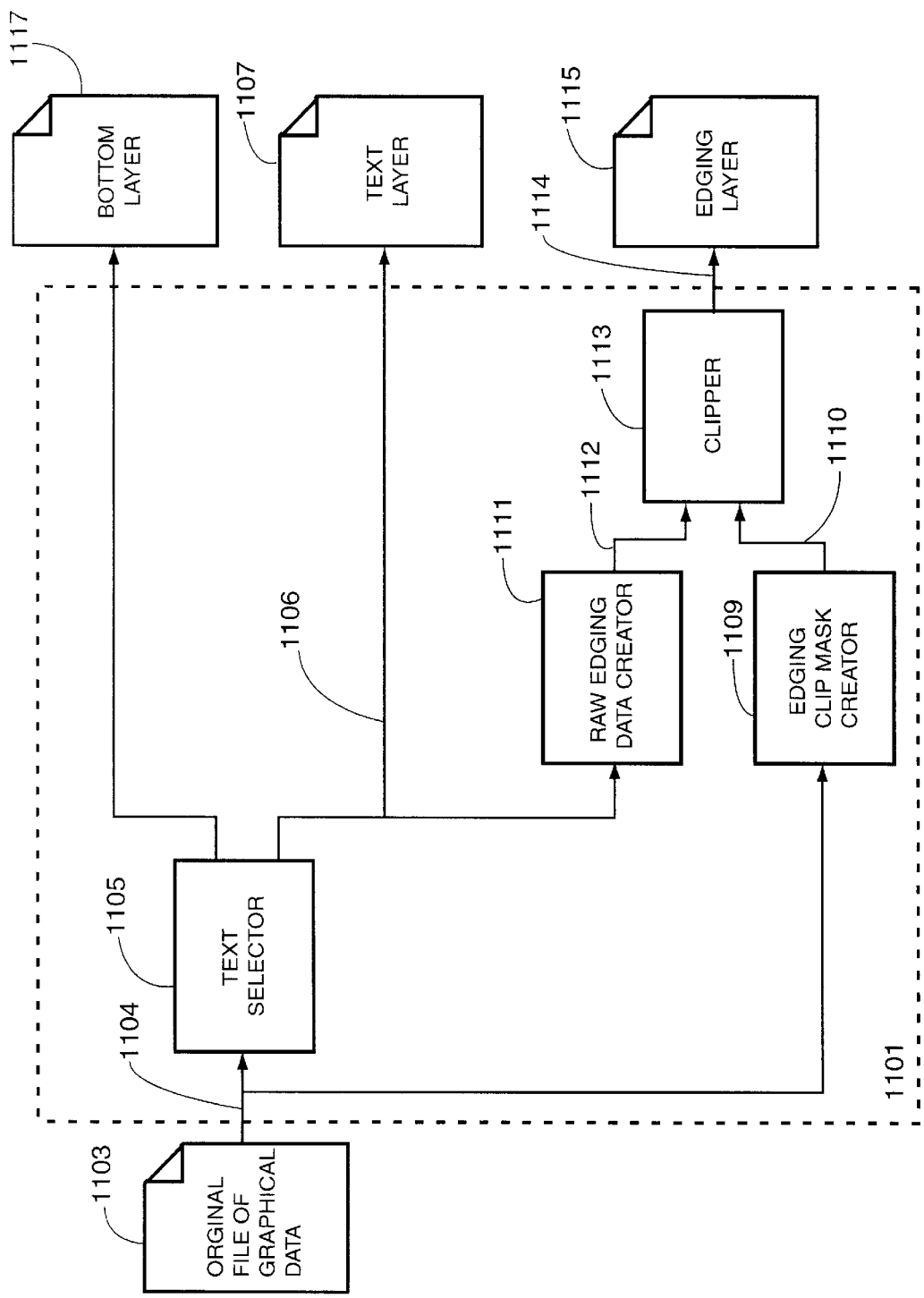
FIG. 11 shows the preferred embodiment for an system for processing a page of graphical data according to the present invention.

The present invention also can be implemented as an edging system for processing a set of graphical data representing a page. Such a system 1101 is shown in FIG. 11. A text selector 1105 selects the text to be enhanced 1106 (including logos and other non-text objects) from the graphical data 1104 representing the page, the page stored as a file 1103 of GRO (or PostScript) commands. This selected text 1106 forms text layer 1107 as the output of text selector 1105. A raw edging data creator 1111 creates from selected text 1106 the raw edging data 1112 containing the enhancing edges. Edging clip mask creator 1109 creates from graphical data 1104 a clip mask which comprises the union of the set of CT clip masks which correspond to the CT images in graphical data 1104. Edging clip mask creator 1109 includes a mechanism for producing the CT clip masks for any CT images in graphical data 1104 for which a clip mask does not already exist. Edging clip mask creator 1109 also includes a mechanism for removing from the union of CT clip masks, the union of all the stroke, solid fill and ghost fill line art in graphical data 1104 that are not covered by CT images. The resulting edging clip mask 1110 is used by clipper 1113 to clip the raw edging data 1112 produced by raw edging data creator 1111. The output 1114 of clipper 1113 forms edging layer 1115. Bottom layer 1117 is produced by text selector 1105 as graphical data 1104 less the selected text 1106 of the text layer 1107. The system thus produces a three layer image data comprising text layer 1107 on top, edging layer 1115, and layer 1117 as the bottom layer.

The elements 1105, 1107, 1109, 1111 and 1113 of edging system 1101 are preferably implemented as software modules of computer commands operating on computer system 10. Alternate embodiments for one or more of these elements include special purpose hardware circuitry, which would include microprocessors or digital signal processor ("DSP") devices, and it would be clear to one in the art how to modify the design to include such special purpose circuitry.

Also, it would be clear to one in the art how to include in the system of FIG. 11 additional elements that perform the additional steps of all of the alternate embodiments of the method of the present invention.

Thus a method and system for improving the legibility of text and graphic objects laid over continuous-tone graphic images by creating an enhancing edge around such text and/or objects has been described.

Although this invention has been described with respect to preferred embodiments, those embodiments are illustrative only. No limitation with respect to the preferred embodiments is intended or should be inferred. It will be observed that numerous variations and modifications may be effected without departing from the true spirit and scope of the novel concept of the invention, and it is intended that the scope of the invention be defined by the claims appended hereto. In these claims, reference is made to text to be enhanced, and it should be clear from this description of the invention that text in this context includes logos and other graphical objects selected for enhancement.

What is claimed is:

1. A method for processing a set of graphical data representing a page to enhance the legibility of text in the page, the method comprising
    (a) selecting text to be enhanced from said set of graphical data;
    (b) creating raw edging data defining enhancing edges in an enhancing color for said text to be enhanced;
    (c) forming an edging clip mask defining areas on said page where said raw edging data is to be visible; and
    (d) clipping said raw edging data with said edging clip mask.

2. The method of claim 1 wherein said enhancing edges are in a default color.

3. The method of claim 2 wherein said default color is white.

4. The method of claim 1 wherein said page includes CT images and wherein said areas comprise the union of the regions of said page that have CT images.

5. The method of claim 4 wherein said edging clip mask comprises the union of CT clip masks corresponding to the CT images in said page.

6. The method of claim 5 wherein said edging clip mask excludes the union of those parts of the page that contain one or more line art object that are not covered by CT images.

7. The method of claim 6 wherein said line art objects comprise objects that are ghosted, have a stroke attribute, have a solid fill attribute, or have a vignetted fill attribute.

8. The method of claim 1 wherein said set of graphical data includes N CT image objects and M filled or stroke-attribute line-art objects that are not covered by any CT image, the fill being either a solid fill, ghost fill or vignetted fill, wherein said step (c) includes determining the CT clip mask for any of the N CT image objects for which a CT clip mask does not exist in said set of graphical data, and wherein said step (c) includes forming the edging clip mask according to the equation $$\text{edging clip mask} = \cup_{i=1 \text{ to } N}\{\text{CT-mask}_i\} - \cup_{j=1 \text{ to } M}\{\text{fill-area}_j\},$$

where $\text{CT-mask}_i$ denotes the CT clip mask corresponding to the i'th CT object, $i=1, 2, \ldots, N$, $\text{fill-area}_j$ denotes the area of the j'th filled or stroke-attribute line-art object that is not covered by any CT image, $j=1, 2, \ldots, M$, $\cup_{i=1 \text{ to } N}$ denotes the union for all i from 1 through N, $\cup_{i=1 \text{ to } M}$ denotes the union for all i from 1 through M, and $-$ denotes the difference operation.

9. The method of claim 8 wherein said step (b) comprises applying a stroke and fill attribute to outlines of said text to be enhanced, said fill attribute in said enhancing color.

10. The method of claim 1 wherein said step (b) comprises applying a stroke and fill attribute to outlines of said text to be enhanced, said fill attribute in said enhancing color.

11. The method of claim 10 wherein said step (b) includes determining the outlines for any of said text to be enhanced which is not available in outline form.

12. The method of claim 10 wherein each said stroke attribute has an edge vignette.

13. The method of claim 1 further comprising
    (e) selecting a subset of the text to be enhanced;
    (f) modifying said subset to form modified text;
    (g) deleting the enhancing edges for said subset from said raw edging data;
    (h) forming new raw edging data comprising the enhancing edges in said enhancing color for said modified text; and
    (i) adding said new raw edging data to said raw edging data.

14. The method of claim 13 wherein said steps (b) and (h), respectively, comprise applying a stroke and fill attribute to outlines of said text to be enhanced, and to outlines of said modified text, respectively, said fill attribute in said enhancing color.

15. The method of claim 14 wherein said steps (b) and (h), respectively, include determining the outlines for any of said text to be enhanced which is not available in outline form, and for any of said modified text which is not available in outline form, respectively.

16. The method of claim 14 wherein each said stroke attribute has an edge vignette.

17. The method of claim 1 further comprising
    (e) creating a text layer comprising said text to be enhanced, said text layer forming a layer of a multilayer data structure for said page;
    (f) creating an edging layer comprising said raw edging data clipped with said edging clip mask, said edging layer being under said text layer in said multilayer data structure; and (g) creating a bottom layer comprising the said set of graphical data minus said text to be enhanced, said bottom layer being under said edging layer in said multilevel data structure.

18. The method of claim 1 further comprising (e) creating a link between each element in said text to be enhanced and the corresponding enhancing edges in said raw edging data.

19. The method of claim 18 further comprising (f) modifying a subset of said text to be enhanced; and (g) creating a corresponding modification to the enhancing edges corresponding to the elements of said subset using the links between the elements of said subset and the enhancing edges corresponding to the elements of said subset.

20. A system for processing a set of graphical data representing a page to enhance the legibility of text in the page, the system comprising (a) a text selector mechanism having an input and an output, the input including said set of graphical data and the output comprising text to be enhanced;

(b) a raw edging data creator mechanism having an input coupled to the output of said text selector mechanism and an output comprising raw edging data defining enhancing edges of said text to be enhanced;

(c) an edging clip mask creator mechanism having an input and an output, the input including said set of graphical data and the output comprising an edging clip mask defining the areas on said page where said raw edging data is to be visible; and (d) a clipper mechanism with a first input coupled to the output of said raw edging data creator mechanism, a second input coupled to the output of said edging clip mask creator mechanism, and an output comprising said raw edging data clipped with said edging clip mask.

21. The system as in claim 20 wherein each of said elements (a), (b), (c) and (d) comprises a corresponding set of software commands loaded in a memory subsystem of a computer system, said software commands executing on a processor of said computer system.

22. The system as in claim 21 wherein said computer system includes a file storage system, said set of graphical data is stored in a first file in said file storage system, and the corresponding sets of software commands of said elements (a) and (c) include commands for reading said set of graphical data from said first file.

23. The system as in claim 22 wherein the corresponding set of software commands of said element (a) includes commands for creating a text layer comprising said text to be enhanced and a bottom layer comprising said set of graphical data excluding said text to be enhanced, said text layer forming a layer of a multilayer data structure for said page, said bottom layer being under said text layer in said multilevel data structure, and the corresponding set of software commands of said element (d) includes commands for creating an edging layer comprising said raw edging data clipped with said edging clip mask, said edging layer being under said text layer and on top of said bottom layer in said multilayer data structure, said multilayer data structure stored in said file storage system.

\* \* \* \* \*